March 26, 1935. H. R. LEWIS 1,996,022
WASHING, GRADING, AND OTHERWISE TREATING GRANULAR MATERIAL
Filed May 4, 1931 4 Sheets-Sheet 1

INVENTOR
Harold R. Lewis
BY
Graham
ATTORNEY

March 26, 1935. H. R. LEWIS 1,996,022
WASHING, GRADING, AND OTHERWISE TREATING GRANULAR MATERIAL
Filed May 4, 1931 4 Sheets-Sheet 2

INVENTOR
Harold R. Lewis
BY
ATTORNEY

March 26, 1935.   H. R. LEWIS   1,996,022
WASHING, GRADING, AND OTHERWISE TREATING GRANULAR MATERIAL
Filed May 4, 1931   4 Sheets-Sheet 3

INVENTOR
Harold R. Lewis
BY
ATTORNEY

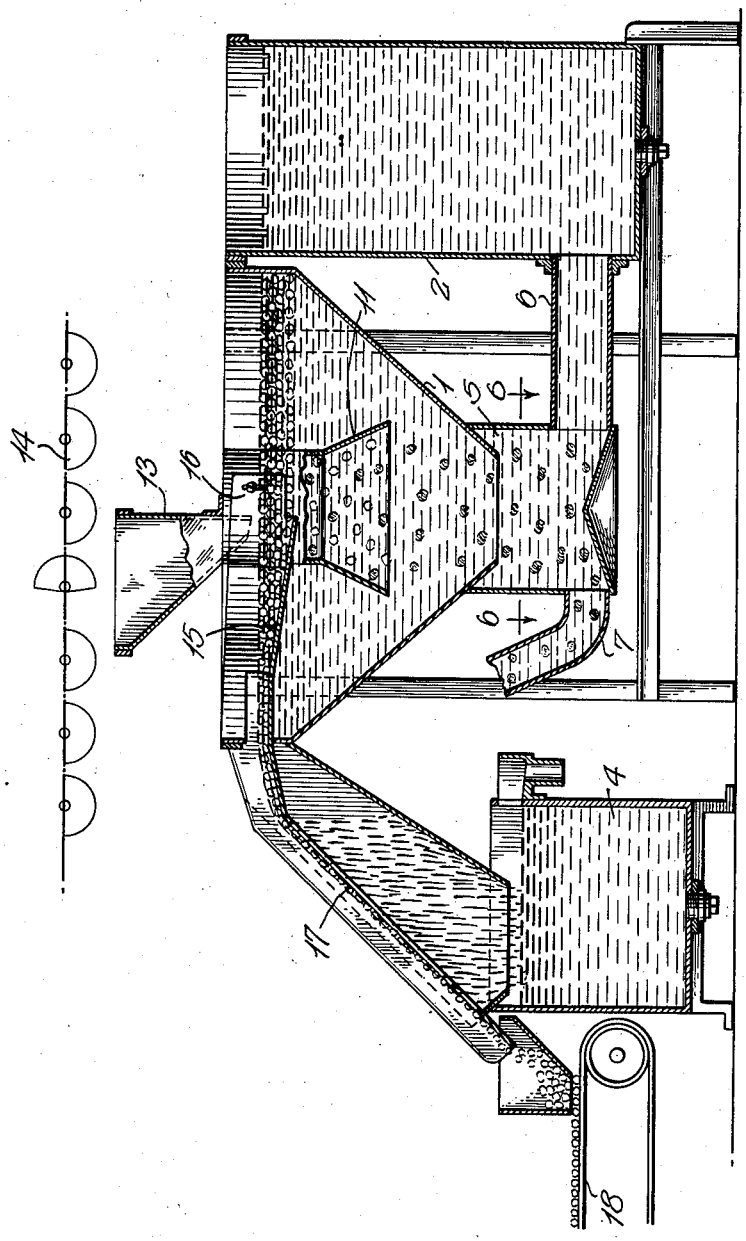

Patented Mar. 26, 1935

1,996,022

UNITED STATES PATENT OFFICE 1,996,022

WASHING, GRADING, AND OTHERWISE TREATING GRANULAR MATERIAL

Harold R. Lewis, Hoopeston, Ill., assignor to Sprague-Sells Corporation, Hoopeston, Ill.

Application May 4, 1931, Serial No. 534,990

9 Claims. (Cl. 209—173)

This invention relates to an apparatus and method of grading and separating granular material of various kinds such as peas, beans, berries, whole grain corn or any other product susceptible to a method of separation by immersion in a suitable liquid wherein the difference in specific gravity of a mixed product will produce a separation while immersed.

When peas, beans and similar products are grown for commercial canning and preserving purposes, land and weather conditions are encountered that are more or less beyond the growers' control. Validity of seeds; depth of planting; methods of cultivation and harvesting are all more or less of a question under conditions of large cultivation, all of which bring about varying times of maturity or ripening to a condition suitable for canning, so that, while some of the product will have reached just the desired stage of development, other of the product in the same field will have advanced beyond the desired stage of development and still other parts of the product will not have reached the desired stage of development, all of which means that a very varied and mixed product is delivered to the canning plant to be treated and separated into the varying grades desired for canning purposes.

Referring particularly to peas, these are required young and tender and for some grades of a uniform size and quality for the fancy grades of the pack. Even a few mature peas distributed through a can of fancy grade peas will likely reduce the grading to a lower level both as to quality and price. It is the canners' desire, therefor, to increase as much as possible his pack of "fancy" goods, but in order to do this he must be provided with some means for effectively and quickly separating the "fancy" peas from the other and less valuable commercial grades. Many attempts have been made to separate the more mature product from the young and tender grades by utilizing the natural difference in specific gravity existing between the various grades, by floating them in bulk into and through suitable aqueous media, depending on the heavy and more mature product to sink in the solution and the lighter, or "fancy" grades to float at or near the surface. In order, however, to collect the various grades as separated it has been necessary to resort to more or less inefficient methods. Usually skimming conveyors have been used for this purpose, but the agitation produced by the simple gravity system has had a more or less disturbing effect tending to remix the grades as the skimmers moved through the solution. Tanks of considerable depth have also been used with the idea that there would be more space between the separated groups and therefore they would be more easily removed without remixing, but none of these plans have been entirely satisfactory.

The medium usually used as a separating solution has been a salt brine of varying density according to the conditions and general quality of the product. In the ordinary quiescent solutions it has been found that the density increases quite markedly at the lower levels on account of the settling of the heavier elements in solution and that any product subjected to this increased density for only a very short time becomes so salt laden as to render it unpalatable and unsalable.

Thus there has been present in the canning operations relating to this class of product very uncertain and undesirable conditions of practice that was beyond the easy control of the canner. A few salt laden peas or beans in a can of otherwise high grade product might easily cause a condemnation of the entire pack as of doubtful quality.

Further difficulties were also experienced when attempting to handle and separate the so called "sweet peas" which ordinarily show very little difference in specific gravity between the tender and choice peas and those that are more mature, which condition is due almost entirely to growth conditions. The ordinary specific gravity methods were found quite inefficient for these grades.

Applicant has discovered a method and apparatus for separating the different quality grades of granular product in a rapid commercial way that is highly efficient and dependable and which places in the hands of the canner means for producing a quality graded product quite appreciably better and more uniform than has been before possible.

Applicant has discovered a method of effecting a complete and effective manner of separating the most tender and desirable grades of peas or other product from those of lower grade in a solution of suitable density wherein the solution is in constant motion, in contradistinction to other methods where the solution has been held in substantially quiescent condition during the separating periods, and in providing means for handling and controlling the solution to automatically remove the separated groups as fast as they accumulate so that the separating space is always open for the admission of additional material for treatment.

The method further consists in directing the flow of solution in a manner to quickly remove the light and tender and most desirable product from the separation area so that it will not have time to absorb salt or other deleterious materials from the solution, and also in removing by the flow of the solution that part of the product that is more mature and therefore settles during the separation period.

The method in applicant's invention further consists in so guiding and controlling the flow of solution so that the flow will be sufficient to quickly carry away the floating material as well as the material that settles during the separation period; to quickly separate the product thus carried away from the solution and to carry the solution back to the apparatus for further use, wherein one of the separated groups will move through a spiral path and the other separated groups will move through a straight and somewhat inclined path, the solution from both discharges flowing to the same receiving tank for further use and the separated groups are moved to different places of disposal.

The apparatus part of applicant's invention comprises the provision of means for guiding a flow of solution through a combined vertical and somewhat spiral path, and a further flow of solution through a somewhat straight and inclined path; of providing means intercepting the spiral flow of solution for skimming off the floating material and directing it to means for separation from the solution; of providing means for causing a simultaneous flow of solution in a vertical and spiral path and another portion of the body of solution in an inclined path; of providing means for varying the peripheral speed of the solution flowing through the said spiral path to facilitate the quick removal from the separation area of the floating material, and in the area of slower movement to facilitate the quick settling of the sinking material, so that each mass of separated material is removed by the flow of solution as fast as new material is placed in the solution for treatment, thus providing a continuous flow of mixed material into the separating solution and a continuous flow of separated material from the solution; and of providing means for circulating the separating solution through its various controlled paths.

The apparatus part of applicant's invention further provides means for circulating a separating medium sufficiently fast to quickly carry away the separated groups of product and at the same time to quite effectively keep the solution density more uniform throughout than has heretofore been practical, which reduces the possibility of the fruit or vegetables being treated to absorb the salt or other deleterious materials from the solution due to increased density in different parts of the body of solution occasioned by a too quiescent condition of operation, during the separating period.

It will be quite evident from the foregoing brief general description of applicant's invention that he has evolved numerous novel and new combinations of method and apparatus.

It is therefore an object of applicant's invention to provide a method of separation for food products or other material into groups having differing characteristics.

It is also an object of the invention to separate groups of a food product or other material into other and separate groups of like characteristics and removing the separated groups in substantially opposite directions.

It is also an object of the invention to provide a relatively swiftly moving body of solution in which separation takes place and to remove the separated material by the flow of said solution.

It is a further object of the invention to provide a body of solution for separating materials wherein there is a varying flow of solution in different parts of the apparatus.

It is also an object of the invention to provide a body of separating solution moving in a circular path and so guiding the flow that material placed therein will be separated into groups of like characteristics and carrying the separated groups away from the area of separation by the natural flow of the solution.

It is a further object of the invention to provide a body of separating solution moving in a circular path and so guided in its flow that material placed therein will separate in a vertical direction and after separation will be floated out of said separation area by the natural flow of the solution.

It is also an object of the invention to provide a body of separating solution that is divided into a plurality of paths, placing a material into said solution where separation will take place, and the separated material will follow the flow of the solution away from the separation area.

It is a further object of the invention to provide a body of separating solution that is caused to flow through a diversity of different directions, placing a material in said solution where separation will take place in a vertical direction and the separated material will follow the flow of the solution away from the area of separation.

It is also an object of the invention to provide a body of separating solution tending to move in a vertical direction, applying an energizing stream into said body of solution to give a whirling motion to a portion thereof, placing a material in said solution for separation and flowing the separated material away from the area of separation.

It is also an object of the invention to provide an apparatus for containing a body of separating solution which supplies a separating area of comparatively rapid moving solution and an area of comparatively slowly moving solution, placing a material in said solution for separation wherein the heavier material will settle into the body of slower moving solution and the lighter material will follow the flow of the more rapidly moving solution.

It is also an object of the invention to provide an apparatus for containing a body of separating solution, means for causing a flow of solution, means for varying the speed of flow of said solution, means for directing material into said solution and means for guiding separated material out of said body of solution.

It is a further object of the invention to provide an apparatus for containing a body of separating solution, said means comprising a tank larger at the top than at the bottom, causing flow of solution through said tank, placing material in said solution while in the tank where separation will take place and providing fixed means intercepting the flow of solution for guiding one of the separated groups out of said body of solution.

It is a further object of the invention to provide a tapered tank for containing a body of separating solution, causing a flow of solution therethrough, injecting an energizing stream into said body of solution to accelerate the flow thereof, placing material in said energized solution where separation takes place and guiding the separated groups from said tank by the flow of solution therethrough.

It is also an object of the invention to separate peas and like materials into groups of like characteristics wherein the separation takes place so quickly that the tender skinned peas or other material are separated and removed from the separating medium before they have an opportunity of absorbing deleterious materials from the solution.

It is also an object of the invention to separate peas and like materials in a comparatively swiftly flowing solution and agitating the solution so that a more uniform density of solution is maintained during operation.

It is also an object of the invention to separate a material in a flowing solution and protecting the immediate body of solution where the separation is taking place from the effect of rising current of air or solution so that separation is in no wise retarded.

With such objects in view as well as other advantages inherent in the invention, the novel structural peculiarities, novel organization of elements, and the separate and collective operations involved in carrying out the recited objects of the invention, which will be made the subject matter of claims hereto appended, I wish it understood that the several necessary elements and combinations constituting the same may be varied in their proportions, placement, general arrangement and operative relation without departing from the scope and nature of the invention.

In carrying out the objects of the invention in a concrete form or machine, further objects, advantages and improvements have been effected than have been recited, and in order to make the invention more clearly understood there are shown in the accompanying drawings, means and mechanism embodying the preferred structural arrangement and disposition of the different parts and combinations, in which I have simply illustrated one way of embodying the creative part or concept of the invention in an operative machine or apparatus, and in doing so I do not wish to limit the claims to the exact details shown, the described devices being only embodiments of the invention that other structures might employ, and some of the parts and combinations of parts might be used without others in different types of machines without departure from the purview of the invention so that I regard myself as entitled to all such variations from the shown and described devices as fall within the scope and meaning of the claims.

Reference now being had to the accompanying drawings a better and clearer understanding of the invention will be had, wherein:

Figure 4 is a sectional elevation of Fig. 1 taken on approximately the line 4—4 of Fig. 2.

Figure 5 is a sectional plane of the tank portion of the apparatus taken on approximately the line 5—5 of Fig. 1.

Figure 1:
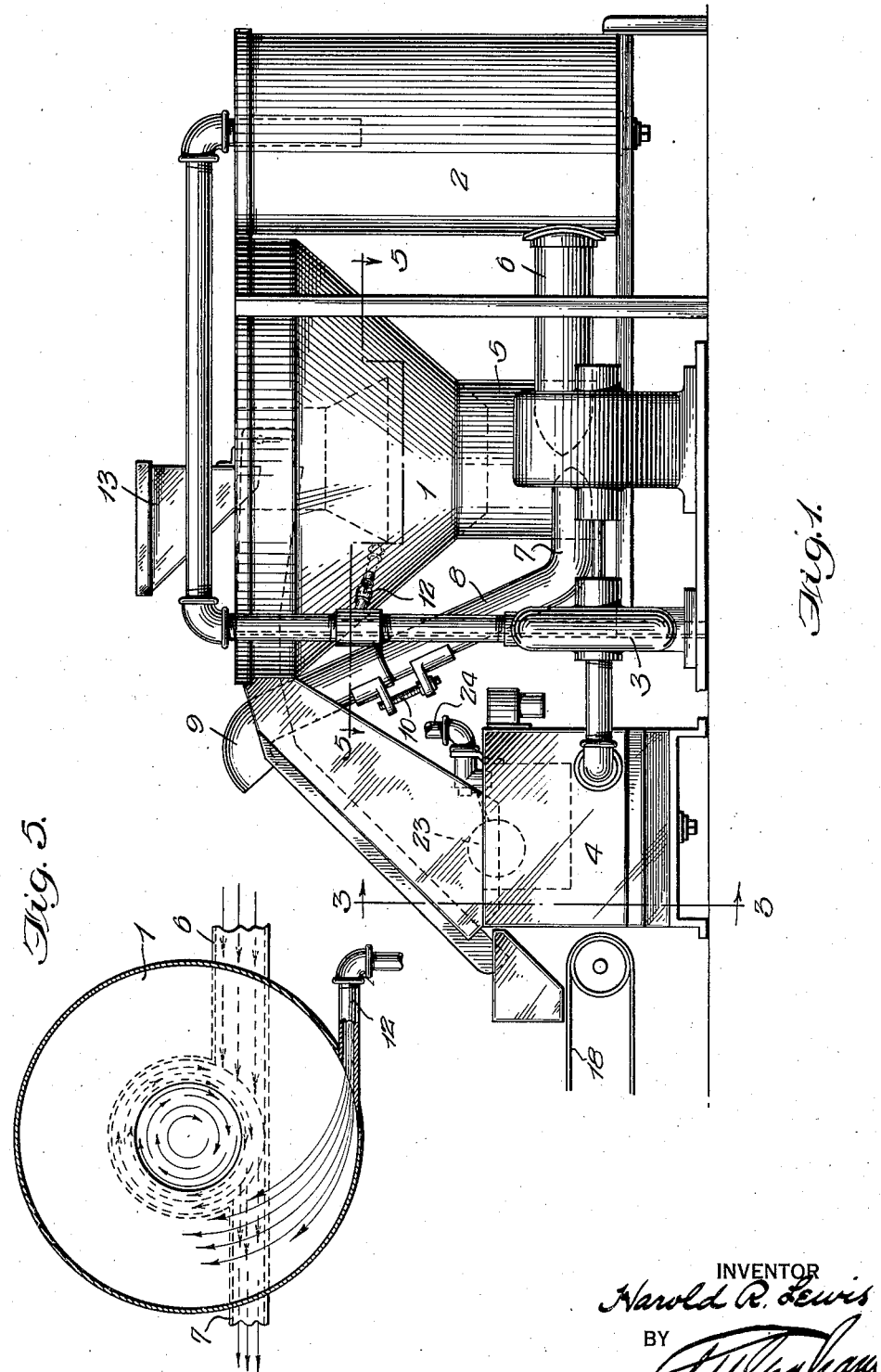
Figure 1 is a side elevation of an apparatus embodying the invention.

Before passing to a description of the machine represented by the accompanying drawings applicant wishes to point out that these drawings are more or less diagrammatic in character; are not necessarily drawn to scale, they may not represent the best or the preferred engineering practices in connection with the construction of machines of this type or character, and the proportions and relation of the parts may be more or less exaggerated in size and shape to better illustrate the application of the invention to an operative and illustrative machine.

The general arrangement of an apparatus embodying this invention comprises a centrally disposed tank for holding a body of separating solution indicated by the numeral 1, this tank is tapering with the top somewhat larger in diameter than the bottom. Adjacent the separating tank 1 is a supply or reserve tank 2 which receives solution from the pump 3 drawn from the supply tank 4.

While the sides of the tank 1 are tapering there is a bottom extension 5 dropping from the apex of the taper of the tank 1 and having a receiving and a discharge conduit, the first as at 6 running from the tank 2 to the extension 5 and the second as at 7 running from the extension 5 to an inclined discharge chute 8. Mounted on the upper end of the discharge chute 8 is an adjustable head by means of which the level of the liquid in the tank 1 can be controlled, this adjustable head is numbered 9, and is adjusted by the screw 10.

By reference to Fig. 4 it will be seen that the apex of the cone of the taper tank 1 extends down into the extension 5 and directly over the apex there is positioned a centrally disposed member 11 that is tapered at its lower end and extends up through the solution and is intended to trap rising air bubbles caused by the flow of solution into the bottom of the tank 1.

Figure 2:
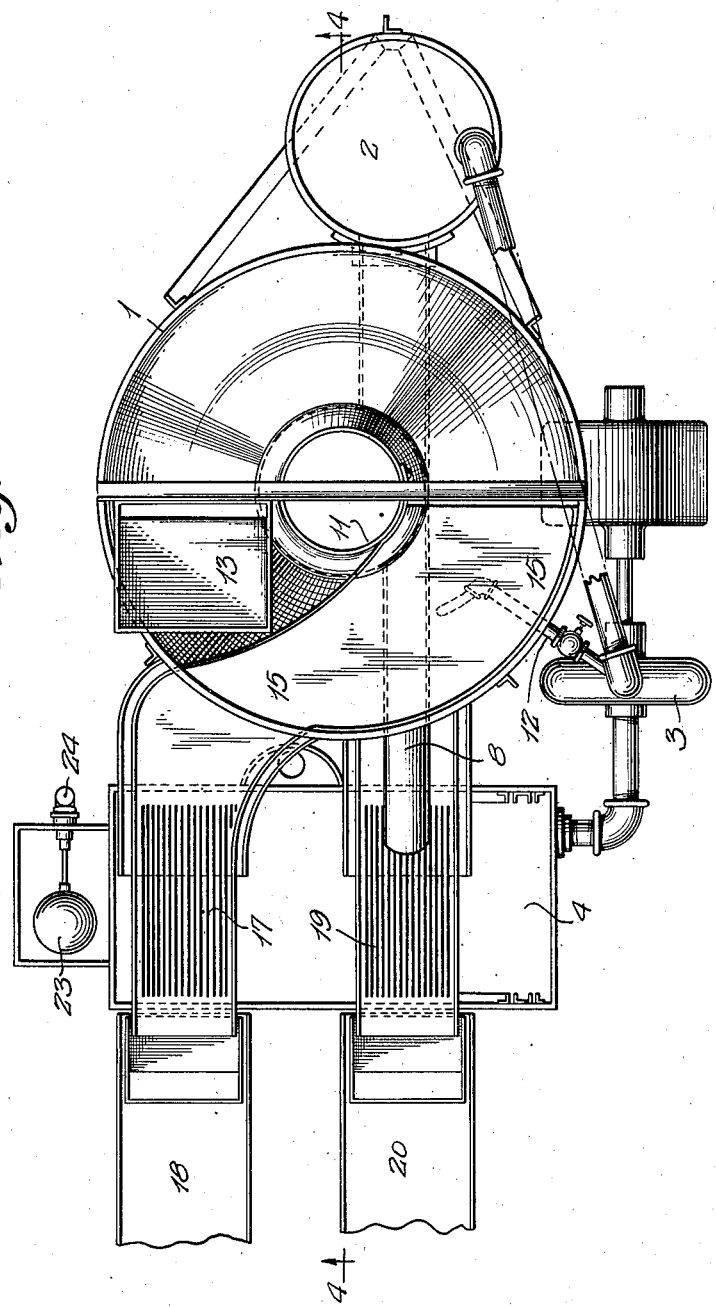
Figure 2 is a plan of Fig. 1.
Figure 3:
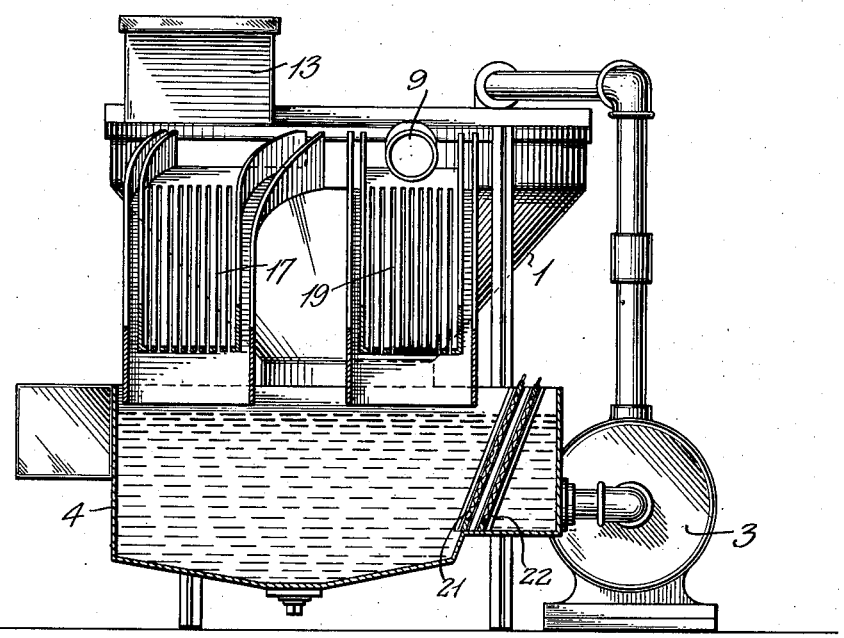
Figure 3 is a left end elevation, partly in section, of Fig. 1, taken on approximately the line 3—3 of Fig. 1.
Figure 6:
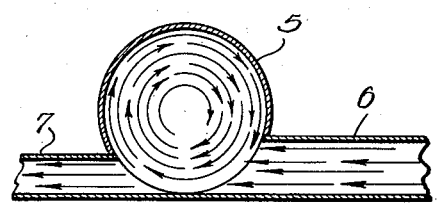
Figure 6 is a sectional plane taken on approximately the line 6—6 of Fig. 4.

At 12 Fig. 2, there is shown a small injector pipe and valve arranged to inject a stream of varying intensity into the body of solution in the taper portion of the tank 1, which has the effect of creating a swirling movement in the solution around the periphery of the taper tank, as is well shown in Fig. 5. The flow of solution from tank 2 through the conduit 6 into the lower extension 5 will also cause a swirling movement to the solution in 5 and cause a movement of solution through the conduit 7, up the inclined chute 8 discharging through the adjustable head 9. This swirling action is shown in Fig. 6.

Referring to Figs. 2 and 4 will be seen a feeding chute 13 which may receive material to be treated in any well known manner as by the conveyor buckets 14 which are moving continuously and will deposit uniform quantities of material into the top of the tank 1.

The centrally disposed member 11 extending up through the body of solution, together with the outer wall of the tank 8 forms what may be termed a circular raceway through which the swirling solution flows.

The material to be treated being deposited in this raceway as shown in Fig. 2 will immediately follow the movement of solution and the material that continues to float in passing around the raceway will be skimmed out of the upper region of the body of solution as in Fig. 4, and as the speed of the solution in this region is quite rapid the floating material will be washed over the skimming plate 15, which is adjustably mounted as at 16 which provides means for skimming as deeply in the solution as is desired.

As the floating material is washed over the skimming plate 15 it passes onto the screen which separates the solution from the material passing the solution back to the tank 4 and the material onto a belt 18 for further disposal or to any other machine or apparatus.

The settling material gradually reaches the bottom of the extension 5 and is caught by the swirling solution and carried up the inclined chute 8 and discharged with the solution onto the screen 19 which separates the solution from the material, passing the solution to the tank 4 and the material to a belt 20 for further disposal or to any other machine or apparatus.

In washing the separated groups from the region of separation onto the screens 17 and 19 more or less of debris of various kinds such as split, peas or beans, or broken portions of fruit or other material being treated will flow with the good material and must be separated therefrom and placed for easy and frequent disposal so it will not get into the solution and thus clog the pump 3. This is accomplished by discharging this refuse with the solution into an auxiliary portion of the tank that is screened from the suction pipe leading to the pump, and the screens, of which there are two as at 21 and 22, will catch all of this debris and keep it away from the pump. By having two screens one can be removed for cleaning and the remaining one will catch debris so that continuous operation of the machine need not be disturbed.

There is a slight loss of solution during operation that adheres to the material being treated and this loss is supplied by means of an automatic device consisting of a float valve 23 connected to a supply pipe 24 leading from a suitable supply not shown.

Operation

The foregoing description of the details of construction have dealt with substantially all of the operative parts of the apparatus and any such that have not been mentioned will be fully treated in the operative description to follow.

In starting operation of the device we will handle peas as the commodity to be treated first and will then follow with a mention of some other products adapted to treatment with this machine.

The machine would first be filled with a solution of proper density and a flow of solution started. The pump 3 would draw solution from the tank 4 and discharge it into tank 2 from which it would flow by gravity through conduit 6 into the lower extension 5 of the tank 1. The filling of tank 1 would simply require a steady vertical rise of solution until enough had been supplied to overflow the adjustable head 9 which determines the level of fluid in the tank 1. As soon as the machine is full of solution and overflow begins, the injector pipe and valve 12 will be brought into play and sufficient solution admitted under pressure from the pump to cause a swirling movement to the solution in the tank 1 and lower extension 5 as is indicated by the arrows in Figs. 5 and 6. The swirling action being dependent on the quantity of fluid admitted through the pipe 12.

The peas to be treated for this demonstration are of the ordinary variety that have been previously gradded for size and blanched, which latter treatment renders them very sensitive to absorption. It being understood of course, that peas may be graded by this apparatus without either previous grading for size or blanching.

The blanched peas are dumped by the conveyor buckets into the distributing hopper where they are spread out over the surface of the swirling liquid and are carried around over more than half the area of the top region of the solution, during which period the heavier peas will begin to settle and will be swirled around just under the edge of the skimming plate 15 and will gradually settle to the extreme bottom where they will encounter the swirling action of the solution in that region nad will be floated up the inclined chute 8 and discharged with the body of solution onto the screen 19.

The lighter and more tender peas will float just above the edge of the skimming plate 15 and will by the rush of solution be carried out over the plate and discharged with the solution on the screen 17.

The degree of separation may be regulated to suit the particular grade of tender peas desired by raising or lowering the inner edge of the skimming plate 15 by means of the adjustment 16. If the edge is immersed deeper into the solution more of the finer grade will be washed or floated out over the skimming plate and if the edge of the plate is raised fewer of the lighter and finer grade will be floated out over the plate, it being understood that the very tender peas will float just a little higher in the solution than those just a little harder so that the canner can control to a very fine degree just the grade he desires to pack as his "fancy" grade.

I wish to make it clearly understood that while I separate peas in a comparatively rapidly moving stream which is flowing in a circular path the exact body of solution in which the peas are first immersed and with which they move at the same speed is equivalent to a quiescent solution, because there is no agitation whatever that will disturb the position of the peas in the stream during the short separation period.

Applicant has provided means in the centrally disposed member 11 for assuring a non-agitated flow of solution, because as has been stated the member 11 and the outer wall of the tank 1 provide a raceway through which the solution circulates without disturbance of any kind so that while both the solution and the peas carried thereby are moving in a circular path there is no movement relative to the solution and peas and separation takes place by simple gravity in a vertical direction while the peas travel around the raceway from the hopper to the edge of the skimming plate. In fact the separation is just the same as would be effected if the solution was wholly quiescent. This unagitated condition of the solution is of course mostly confined to the top region of the separating tank and above the injector stream flowing into the tank through the pipe 12. When the settling peas reach the region below the edge of the skimming plate 15 they soon pass into the influence of the injector stream and are swirled more rapidly to cause them to settle faster and reach the tangent stream through the conduits 6 and 7 whereby they will be ejected from the solution before they have time to absorb deleterious materials therefrom.

The flow of the solutions through the conduit 6 into the region 5 is comparatively slow in relation to the flow through the conduit 7 due to the difference in diameter of the conduits, but even with this comparatively slow circulation some bubbles and agitation are produced and the bubbles rising will all pass into the center space defined by the member 11 and will not reach the area of fine separation in the top of the tank 8. The peas that sink are heavy enough not to be influenced by any bubbles or a slight agitation they may encounter in their passage to the bottom of the tank By manipulating the valve 12 for a stronger ejector stream and raising the adjustment 9 to increase the level height of liquid in the tank 1 a stream of sufficient depth may be produced to flow over the plate 15 to carry quite large objects along, which adapts the machine to the handling of a great variety of product. The operation when handling blanched peas has just been described so we will now pass to other conditions of operation.

The handling of peas that are not previously graded for size or that have not been previously blanched would be substantially the same as for the graded and blanched product.

While a brine solution has been mentioned for the handling of peas it is of course understood that any liquid suitable for the purpose may be used in any separation that can be handled by the machine.

Such fruits as berries are very conveniently and economically washed by this machine in plain water. The berries and debris that accumulates with them while picking and handling are dumped into the hopper where the mixed mass will be distributed evenly over the surface of the liquid and in its passage around the raceway the berries will settle below the edge of the skimming plate and the debris, such as leaves, crushed berries, twigs, etc., will float and be washed out over the skimming plate, while the sinking berries will be discharged through the chute 8 the same as has been described for peas.

In preparing peas for canning the machine is very effectively used to separate thistle buds by using plain water. The mixed product is dumped into the solution the same as for other treatment of peas and the peas all settle and the thistle buds float and are floated out over the skimming plate.

This machine has been found to be very satisfactory for washing whole grain corn. In the cutting of whole grain corn small pieces of cob, silks, husks and other debris is accumulated with the corn kernels, this mixed mass is dumped into a body of plain water and the whole grains sink while the debris floats out over the skimming plate.

Due to the extreme simplicity of construction of this piece of apparatus it is most effectively and easily kept in clean and sanitary condition. By simply removing the separating solutions from the various tanks and conduits, steam or hot water charged with cleansing agents if desired may be pumped or sprayed over the entire interior in a short space of time.

While I have confined the description more or less to the smaller food and other products the machine is equally applicable to the handling of almost any kind of fruit or vegetables and it is thought that citrus and other fruits may be treated in the various ways desirable with the handling of such fruits in their preparation for storage and market.

In the operation of the machine for other products than those enumerated some changes in construction might be desirable and necessary which may be easily accomplished without changing the general mode of operation or the methods employed to gain the desired results.

What I claim as new and desire to secure by Letters Patent is:

1. An apparatus for separating buoyant material from a mass of mixed material comprising a circular tank having a centrally disposed tubular member fully open its entire length for containing a body of separating liquid, means for imparting a circular movement to said liquid around said central tubular member to produce an upper and a lower stream, means for depositing a mass of mixed material into said upper stream outside of said central tubular member wherein the buoyant material will float in said stream and the balance of the mass sink to the lower stream, a vertically adjustable septum arranged adjacent said upper stream with an edge immersed in said stream to intercept the floating material and direct it with liquid away from the separating zone, with means receiving said floating material and liquid and separating the liquid from the material, means for receiving the lower stream of liquid with the sinking material and directing them away from the tank and further means for receiving the said material and separating it from the liquid.

2. An apparatus for separating buoyant material from a mass of mixed material comprising a tank having a centrally disposed tubular member fully open its entire length through which a constant stream of separating medium flows, means for causing a flow of medium through said tank around said tubular member, means for dividing said flow into two distinct streams, means for producing a circulating movement to one stream, means for depositing a mixed mass of material into the circularly moving stream outside of said tubular member, where the buoyant material separates from the mass, vertically adjustable means in said circular moving stream for intercepting the buoyant material and leading it and some liquid away from the separating zone, the rest of the mass sinking into the other of said streams and being carried thereby away from said tank with means outside of said tank for separating the liquid from the separate groups of material.

3. An apparatus for separating buoyant material from a mixed mass of material comprising a tank having a centrally disposed tubular member fully open its entire length for containing a body of separating medium, means for supplying separating medium to the bottom of said tank in large volume and slow movement to avoid agitation, means intercepting said flow of medium and directing a portion of it through a path leading away from said tank, the rest of said medium rising in said tank to form the body of separating medium, means for injecting additional medium into the body of medium tangentially thereto to produce a circular movement to said body of medium, means for depositing a mass of mixed material into said body of medium outside of said centrally disposed tubular member wherein the buoyant material will float and the rest sink therein, a vertically adjustable septum located adjacent the top surface of the body of medium for intercepting and directing away therefrom the said buoyant material with some liquid the rest of the material sinking in said body of liquid and encountering the flow of medium in the bottom of said tank and flowing therewith away from said tank with means for receiving the liquid flowing away with said separated groups of material and returning it for further use.

4. An apparatus for separating buoyant material from a mixed mass of material comprising a tank for containing a body of separating liquid, means for supplying liquid to said tank, means intercepting said supply and diverting a portion thereof away from said tank to cause a lower flow stream, the rest of said liquid rising in said tank to form the body of separating liquid, a single tubular member located centrally of said tank and having its lower end fully open for entrapping air bubbles rising with said liquid and separate them from the zone of separation of said buoyant material from the mass, said tubular member producing a circular raceway adjacent the top surface of said body of liquid, means for depositing a mixed mass of material into said raceway where the material is separated, the buoyant portion floating on the top of said body of material, vertically adjustable means for removing said buoyant material therefrom, the sinking material encountering the liquid flowing into said tank and being carried away thereby.

5. An apparatus for separating a buoyant material from a mass of mixed material comprising an upright circular tank for containing a body of separating liquid, means for circulating the liquid in said tank, means for imparting to said flowing liquid in said tank upper and lower streams, the upper stream moving through a circular path and the lower stream through a horizontal path, means for depositing a mixed mass of material into the upper stream for separation of the buoyant part of the material which will follow the circular flow of the upper stream and separate from the mass, a vertically adjustable septum for intercepting the floating material and diverting it upward out of the liquid, the septum being pivoted at one side, said septum directing the floating material and some liquid away from the area of separation in varying degree according to the vertical adjustment thereof while the rest of the material sinks into the liquid and encounters the lower stream which acts as the medium to remove and elevate the said material from the tank.

6. An apparatus for separating buoyant material from a mass of mixed material comprising an upright circular tank for containing a body of separating liquid, a vertically disposed tubular member in the top of said tank with its lower end immersed in the liquid, means at the bottom of said tank for admitting liquid thereto, means for intercepting a part of said liquid and leading it away from said tank, the other of said liquid rising in said tank to form the body of separating medium, means for depositing a mixed mass of material into the top of said body of liquid outside of said centrally disposed tubular member, means for producing a circular flow to the top of said body of liquid to carry said material through a circular path around said tubular member while separation of the buoyant material takes place, a vertically adjustable septum located adjacent the top of the body of liquid to separate the buoyant material and some liquid from the body of liquid and direct it away from the separation zone, the sinking material encountering the lower stream adjacent the bottom of the tank and being carried away thereby.

7. An apparatus for separating buoyant material from a mass of mixed material comprising an upright circular tank for containing a body of separating liquid, a vertically disposed tubular member in the top of said tank and having its lower end immersed in the liquid, means for supplying liquid to said tank near the bottom thereof in large volume and comparatively slow movement, means permitting a part of said flowing liquid to pass directly through the bottom portion of the tank to form a lower flowing stream, the other of said liquid rising in said tank to form the body of separating media, means for depositing a mixed mass of material into said media outside of said centrally disposed tubular member, means for causing a flow of said medium around said tubular member while separation of the buoyant material from the mass takes place, vertically adjustable means intercepting said circular flow to direct the buoyant material and some liquid away from the separating zone, the sinking material encountering the lower stream and flowing away therewith with means outside of said tank for receiving each of said separated groups and separating the liquid therefrom with means for returning said liquid to the main supply for reuse.

8. An apparatus for separating material according to differences in specific gravities comprising a circular settling tank, means for introducing and discharging a flow of liquid into and out of the lower portion of said tank to produce a depth of liquid in the tank and to discharge sinking material therefrom, a tubular member arranged concentrically of said tank and projecting downwardly into the liquid therein to isolate the central portion of said liquid from the surrounding body thereof, said tubular member being open to the atmosphere at its upper end and having a lower open end disposed directly above the point of introduction of liquid into said tank to receive air bubbles rising in the liquid from the incoming supply and isolate the same from the surrounding body of liquid, means for circulating the liquid in said tank in an annular path around said tubular member, and means for delivering material into said liquid at a point within the area surrounding the tubular member to effect separation of the lighter material and sinking of the heavier material without interference by the rising stream of air bubbles.

9. An apparatus for separating material according to differences in specific gravity comprising a circular settling tank having a central inlet opening at its bottom, a conduit connecting with said opening and extending therepast, means for establishing a flow of liquid through said conduit to produce a depth of liquid in said tank and to carry away material sinking downwardly through said opening, a tubular member arranged concentrically of said tank and projecting downwardly into the liquid therein to isolate the central portion of said liquid from the surrounding body thereof, said tubular member being open to the atmosphere at its upper end and having a lower open end disposed directly above said inlet opening to receive air bubbles rising from said inlet and isolate the same from the surrounding body of liquid, means for circulating the liquid in said tank in an annular path around said tubular member, and means for delivering material into said liquid at a point within the area surrounding said tubular member to effect separation by flotation of the lighter material and sinking of the heavier material without interference by the rising stream of air bubbles.

HAROLD R. LEWIS.